United States Patent [19]

Fleischer

[11] 4,350,373

[45] Sep. 21, 1982

[54] COUPLING DEVICE

[76] Inventor: Henry Fleischer, 18 Notch Park Rd., Little Falls, N.J. 07424

[21] Appl. No.: 138,216

[22] Filed: Apr. 7, 1980

Related U.S. Application Data

[60] Division of Ser. No. 920,403, Jun. 29, 1978, Pat. No. 4,209,190, which is a division of Ser. No. 659,370, Feb. 19, 1976, Pat. No. 4,108,475, which is a division of Ser. No. 479,667, Jun. 17, 1974, abandoned, which is a continuation-in-part of Ser. No. 427,149, Dec. 21, 1973, abandoned.

[51] Int. Cl.³ .............................................. F16L 21/00
[52] U.S. Cl. ...................................... 285/55; 285/320; 285/332.2
[58] Field of Search ............ 285/320, 319, 313, 332.3, 285/332.2, 15, 16, 17, 55

[56] References Cited

U.S. PATENT DOCUMENTS

| | | | |
|---|---|---|---|
| 373,950 | 11/1887 | Sweet | 285/303 |
| 407,151 | 7/1889 | Beck | 285/303 |
| 724,390 | 3/1903 | Hirschell | 285/332.3 X |
| 758,985 | 5/1904 | Liebl | 285/320 X |
| 932,162 | 8/1909 | Morris | 285/303 X |
| 940,678 | 11/1909 | Doane et al. | 285/370 X |
| 1,509,562 | 9/1924 | Macgregor | 285/280 |
| 1,642,745 | 9/1927 | Pearce et al. | 285/140 X |
| 3,244,437 | 4/1966 | Belicka et al. | 285/303 X |

Primary Examiner—Thomas F. Callaghan

[57] ABSTRACT

An adjustable coupling device is provided which can be secured to each of two sections of conduit, such as two hoses or pipes, by hand, without the need for employing tools. The coupling device comprises a socket member and a plug member which are adapted to be adjustably positioned with respect to each other as one or both members wear, said plug member being adapted to be removably and adjustably disposed in said socket member. The above plug member includes interior walls which define a bore, and securing means, such as teeth or recessed portions. The socket member comprises a body portion having a bore running therethrough defined by the interior walls thereof, which bore is adapted to receive said plug member in a manner such that the bore of said plug member is in communication with the bore of said socket member, and at least one connecting member attached to said socket member and adapted to engage said securing means of said plug member.

6 Claims, 9 Drawing Figures

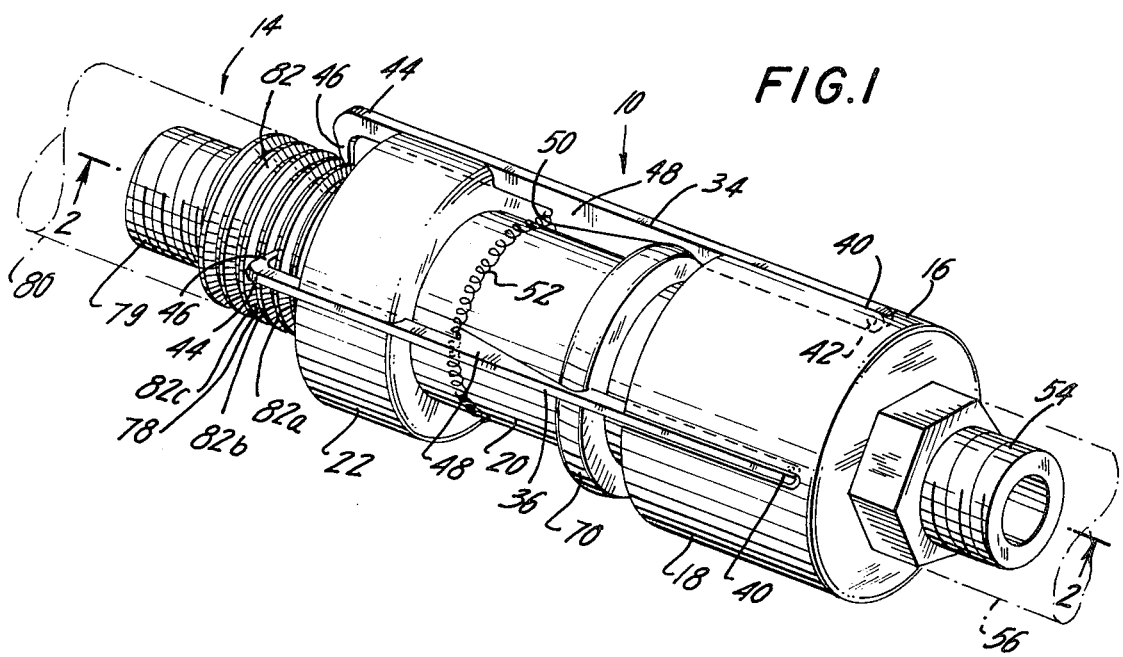
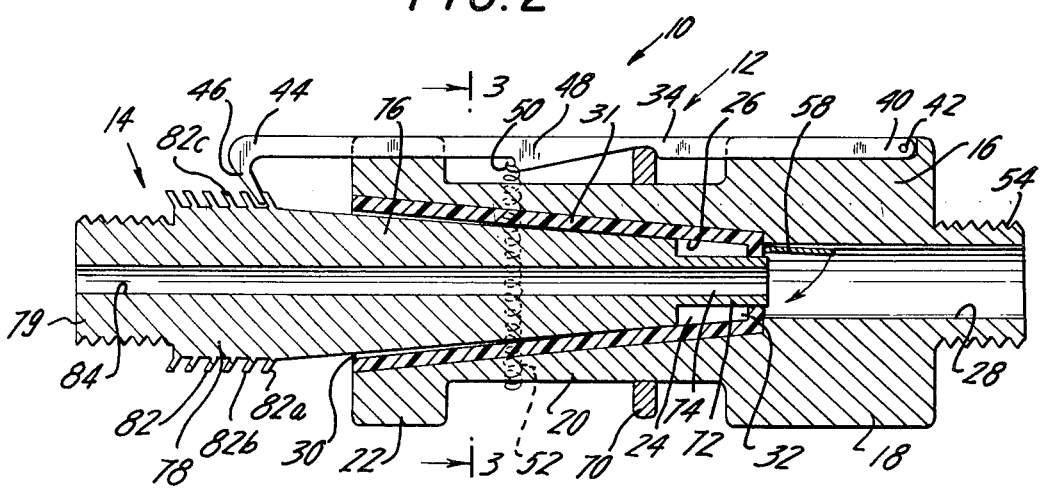
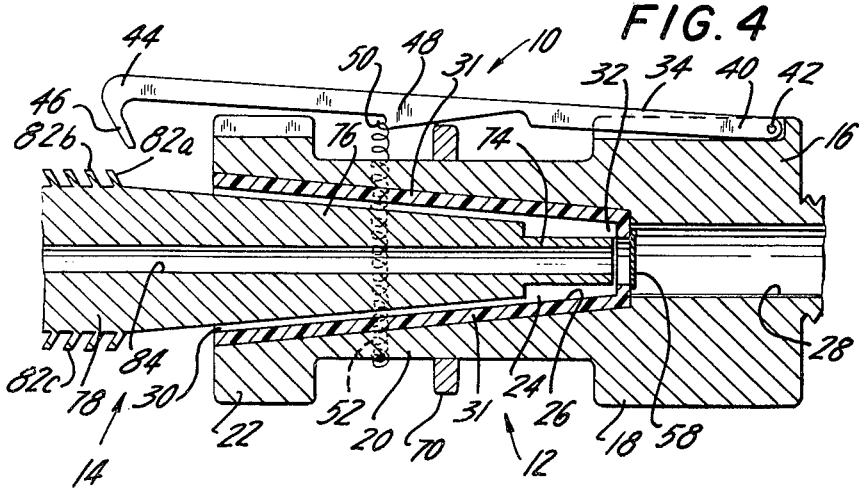
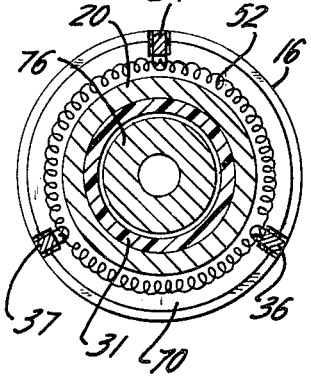

COUPLING DEVICE

REFERENCE TO OTHER APPLICATIONS

This application is a division of application Ser. No. 920,403, filed June 29, 1978, now U.S. Pat. No. 4,209,190 which is a division of application Ser. No. 659,370, filed Feb. 19, 1976, now U.S. Pat. No. 4,108,475, which is a division of application Ser. No. 479,667, filed June 17, 1974, now abandoned, which is a continuation-in-part of application Ser. No. 427,149, filed Dec. 21, 1973, now abandoned.

FIELD OF THE INVENTION

The present invention relates to a coupling device employed for joining two sections of conduit such as two hoses, together in a fluid-tight manner, the coupling device being so designed so that worn components can be repositioned with respect to each other so that unworn portions thereof can be employed to form the fluid-tight joint.

BACKGROUND OF THE INVENTION

Coupling devices for joining two hoses together in a so-called air-tight manner are well known in the art. They are of rather complex construction and include finely machined surfaces which are subject to wear, and generally comprise two pieces, namely, a socket member and a plug member adapted to be seated in the socket member. These members are usually formed of hard steel for increased durability; however, when the plug member is repeatedly inserted in or removed from the socket member, after a relatively short period, portions of the plug member and socket member tend to wear. When this occurs, the air-tight seal provided by the coupling device is lost and fluids flowing through the hoses, which are joined together by the coupling device, tend to leak out of the coupling device between the worn surfaces of the plug member and socket member. Eventually, fluid leakage around the worn surfaces of the plug member and socket member becomes so great that it becomes intolerable and the coupling device is rendered useless. When this occurs, the coupling device is removed from the conduits or hoses and a new, expensive, coupling device is employed in its place. The worn coupling device cannot be repaired and is usually discarded.

The above-described coupling device are usually provided with internal or external threads and a nut for attaching each section of the coupling device to a portion of hose. Normally, attaching of the coupling device to the hoses cannot be accomplished without employing a wrench or other tool. Furthermore, where the coupling device has been worn to a point where it must be replaced, it cannot be removed by hand and must be removed with a wrench or other tool. This can indeed be a time consuming task especially where the coupling device is not readily accessible and/or tools are not readily available.

Conventional coupling devices as described above are usually formed of hard steel and therefore are thought to be relatively tough and durable. Accordingly, they are usually carelessly handled and frequently abused and dropped on hard surfaces, such as concrete floors. Notwithstanding the fact that these coupling devices appear to have impact resistant surface, the jolt received is often severe engough to cause the coupling device to break or mal-function.

In accordance with the present invention, an adjustable coupling device is provided which is of simple design and the components thereof are adapted to be adjustably disposed with respect to each other so that when one or more components wear, they can be repositioned with respect to each other to continue to provide a substantially fluid-tight seal or joint. Furthermore, the coupling device of the invention can be provided with unique clamping members which allow attachment of the components of the coupling device to conduit sections, such as to two hoses, by hand, without the need for employing wrenches or other tools.

BRIEF STATEMENT OF THE INVENTION

In accordance with the present invention, an adjustable coupling device is provided comprising a socket member and a plug member adapted to be removably and adjustably disposed in the socket member so that walls of the plug member and socket member contact with other to form a substantially fluid-tight seal. When portions of the plug member and socket member wear, the plug member can be repositioned in the socket member so as to continue to form a fluid-tight seal with the socket member. The plug member includes interior walls which define a bore which runs from end to end of said plug member. The plug member also includes securing means which are employed in connecting the plug member to the socket member as will be described hereinafter. The socket member comprises a body portion having a bore running therethrough defined by the interior walls of the socket member, which bore is adapted to receive the plug member in a manner such that at least a portion of the outer surface of the plug member contacts the walls defining the inner bore of the socket member and the bores of the plug member and socket member are in communication with each other. The socket member also includes at least one connecting member attached thereto and adapted to engage at least one of the securing means of the plug member when the plug member is disposed in the socket member.

In a preferred embodiment of the invention, the plug member comprises a first tubular end segment, an intermediate segment, the narrow end of which is connected to the tubular end segment, and a second end segment connected to the wider end segment of the conical-like member, the inner bore of the plug member running through each of said first end, intermediate and second end segments of the plug member. The socket member comprises a body portion including first and second end portions and an intermediate portion. The interior walls of the body portion define a bore comprising a tapered passage, the wide segment of which extends from the first end portion into the intermediate portion. The first tubular end segment and the intermediate segment of the plug member are adapted to seat in the tapered passage of the socket member with at least a portion of the outer surface of the plug member in contact with a portion of the interior walls of the socket member.

The tapered passage of the socket member preferably includes a wear-resistant lining material which contacts the outer surface of the conical-like segment of the plug member when the plug member is seated in the tapered passage. The wear-resistant lining material may comprise a metal, such as steel, hard rubber, plastic, leather or other material adaptable for gaskets, and is designed to present a wear resistant surface to the plug member, which surface is designed to wear faster than the plug member. As will be apparent to one skilled in the art, the plug member will be constantly inserted and removed from the socket member and this will cause wear on the plug member including the tubular end segment thereof and lining material of the socket member. As the lining material wears, the plug member can be inserted deeper into the tapered passage so as to present the wider portion of the intermediate section of the plug member to the lining material of the socket member. In this manner, even though the lining of the socket member, and perhaps the outside surface of the plug member may wear, fluid-tight contact between the the plug member and socket member may be still maintained by merely repositioning the plug member in the socket member.

Each of the socket members and plug member will include means for connecting each of these members to a conduit section or hose. For example, each of these members may include a threaded section which is adapted to be engaged with a fitting secured to a hose section.

Further, in accordance with the present invention, there is provided protective cover or sleeve means for protecting a coupling device or related hardware against breakage or malfunction, which may be the result of dropping or contacting such devices against a hard surface. The protective cover or sleeve means comprises a cylindrical tubular member which includes one or more slots therein, and which is adapted to be disposed over a coupling device, such as the socket member of the coupling device of the invention. One or more pins or lugs, corresponding to the number of slots in the protective cover or sleeve, are connected to the device, such as to the ring members of the socket member or clamp member; the pins or lugs extend through and are adapted to be moved along the slots. Thus, the device may be opened or closed by merely gripping the pins or lugs and moving them along the slots, as will be described hereinafter. The lugs extending through the protective shield may be retractable for example, by spring loading or other means. Thus, if an automobile runs over the device, the lugs will be pushed into the protective cover and will usually not be damaged.

BRIEF DESCRIPTION OF THE FIGURES

FIG. 1 is a perspective view of an adjustable coupling device in accordance with the invention;

FIG. 2 is a cross-sectional view of the adjustable coupling device taken along lines 2—2 of FIG. 1;

FIG. 3 is a cross-sectional view of the coupling device shown in FIG. 2 taken along the lines 3—3 thereof;

FIG. 4 is a fragmentary cross-sectional view of the coupling device shown in FIG. 2 where the plug member is not fully seated in the socket member;

DETAILED DESCRIPTION OF THE FIGURES

Figure 5:
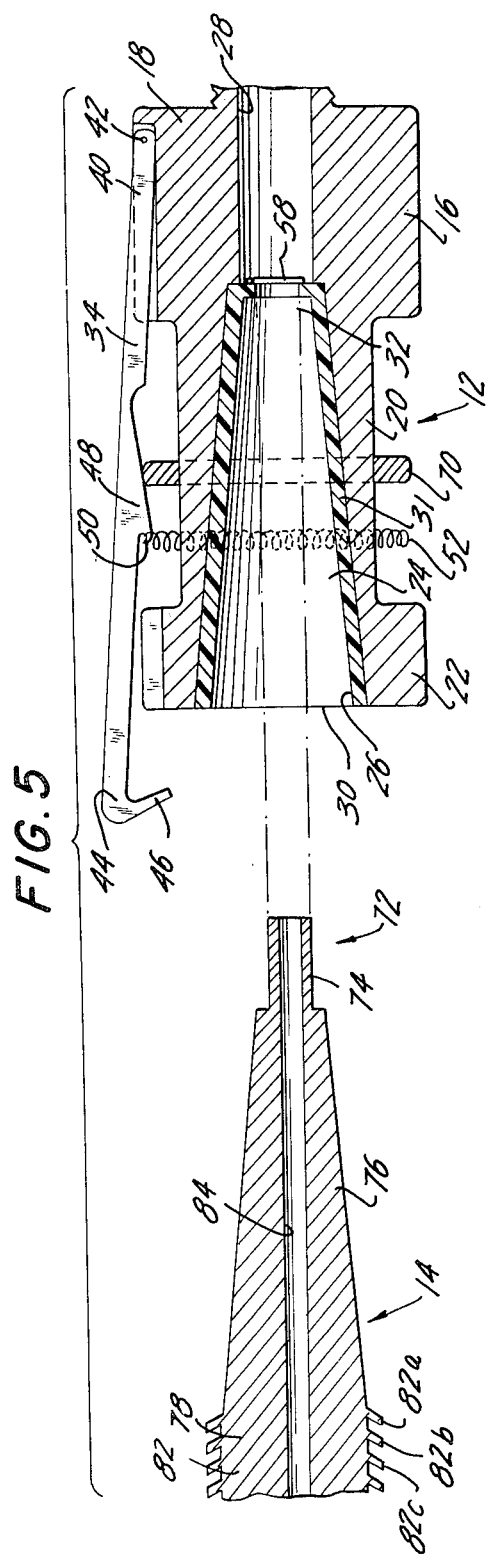
FIG. 5 is an exploded view of the coupling device shown in FIG. 2

Referring to the accompanying Figures wherein like parts are represented by like numerals in the several views, in FIGS. 1 to 5 there is shown a coupling device in accordance with the present invention identified generally by the numeral 10. The coupling device 10 includes a socket member generally indicated by the numeral 12 and a plug member generally indicated by the numeral 14. The socket member 12 includes a body portion 16 having a first end portion 18, and intermediate portion 20 and a second end portion 22. The socket member 12 also includes a tapered bore 24 defined by the inner tapered walls 26 and the inner walls 28 of the socket member 12. The bore or tapered passage 24 extends from end to end of the socket member 12 and includes a wide end 30 and a narrow end 32 so that, in effect, the tapered passage forms a truncated cone-like passage. The inner walls of the tapered passage are preferably lined with a wear resistant material 31 such a plastic material, for example, polyethylene or polyurethane, or metal, for example, brass, lead, steel and the like.

The socket member also preferably includes three connecting rods 34, 36 and 37 as shown in FIGS. 1 and 3, which are fitted in slots in the body portion 16 of the socket member 12 in a manner such that at least a portion of the connecting rods will be disposed below the outer surface of the body portion 16 of the socket member 12. In this manner, the connecting rods will not be broken or other wise damaged if the body portion of the socket member 12 is subjected to a heavy blow. Each of the connecting rods comprises a first end portion 40 which is pivotally connected by means of pivot pin 42 to the first end 18 of the body portion 16. The connecting rods will also include a second end portion 44 which includes first ataaching means 46 in the form of a hook-like member, the purpose of which will become apparent hereinafter. The intermediate portion 48 of the connecting rods includes attaching means 50. A circular coiled spring is disposed about the body 16 of the socket member and is adapted to engage the second attaching means 50 of the connecting rods so as to hold the connecting rods against the body portion of the socket member, where desired, and to prevent the connecting rods from springing away from the socket member.

The first end 18 of the socket member 12 also includes securing means 54 for use in securing the socket member to an end of a hose section 56 (shown in phantom). Such securing means 54 may comprise an internally threaded or externally threaded section which is adapted to be secured to a fitting attached to the hose section 56.

The socket member 12 also includes an annular ring member 70 which is disposed about the body portion of the socket member beneath the connecting rods 48, as shown. When the ring member 70 is moved towards the second end 22 of the socket member 12, the ring member 70 contacts the connecting rods 48 and causes the connecting rods to pivot upwardly so that the first attaching members or hook-like members 46 become disengaged from the plug member 14, as will be described in detail hereinafter.

The plug member 14 comprises a first end 72 which preferably is in the form of a tubular end segment 74 as shown, an intermediate conical-like segment 76 and a second end segment 78. The second end segment 78 includes hose connecting means 79 for securing the plug member 14 to a hose section, which hose connecting means may take the form of an internally or externally threaded section which is adapted to be secured to a fitting connected to the hose section 80 (shown in phantom).

The second end segment 78 of the plug member 14, that is the segment connected to the conical-like intermediate segment 76, includes a plurality of securing means 82 such as connecting teeth. The connecting teeth 82 extend from the surface of the conical member and are angled backwardly so that they can be engaged by the hook-like attaching means 46 of the connecting rods 48. The teeth 82 are preferably blunted at their ends so as to present a substantially wear resistant surface to the hook-like members 46 of the connecting rods 48.

A bore or passage 84 extends through the plug member 14, that is through each of said first and second end segments and said intermediate segment, as shown.

The plug member 14 is adapted to be seated in the tapered passage 24 of the socket member 12 so that the outer surfaces of the plug member 14 contact the inner walls or lining 31 of the tapered passage 24.

A movable closure member in the form of a disk 58 is hingedly secured to the inner walls 28 of the socket member 12 at the narrow end 32 of the tapered passage. The disk 58 will normally be in its closed position, that is, it will cover the opening at the narrow end 32 of the tapered passage of the socket member 12 when the plug member 14 is not seated in the tapered passage. As will be seen hereinafter, when the plug member 14 is seated in the tapered passage 24, the tubular end segment 74 of the plug member will contact the closure member 58 and cause it to open so as to open the narrow end 32 of the tapered passage and allow flow of fluid from the hose section 56 through the bore 24 of the socket member 12 into the bore 84 of the plug member 14 and thence into the hose section 80. The fluid flowing from the hose section 56 through the bore 54 into the tapered passage 24 will cause the closure member or disk 58 to remain in the open position as shown in FIG. 2.

Figure 6:
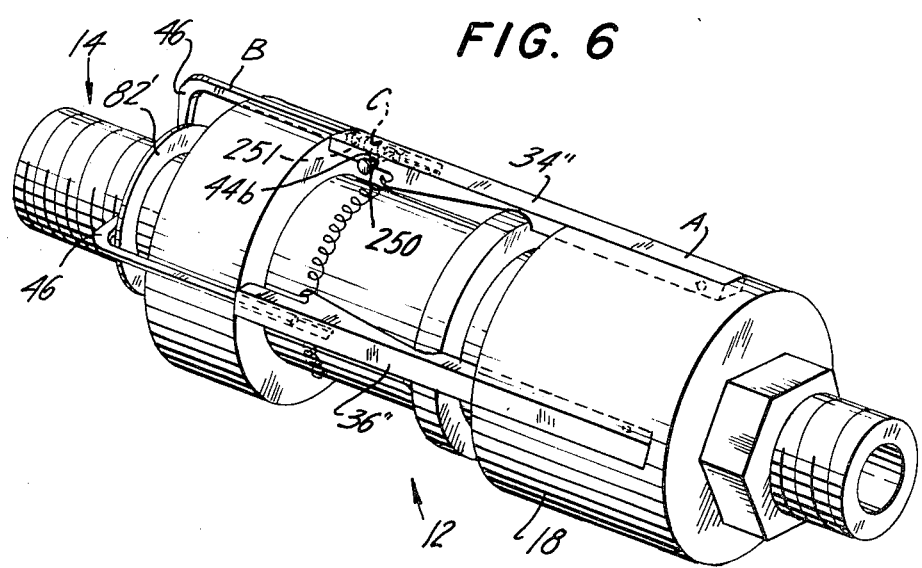
FIG. 6 is a perspective of yet another embodiment of the adjustable coupling device in accordance with the invention.
Figure 8:
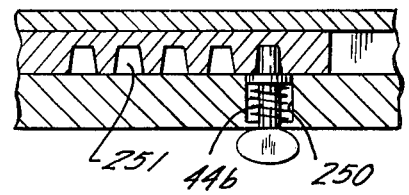
FIGS. 7 to 9 are detailed views of the connecting members and securing means employed in the coupling device shown in FIG. 6.
Figure 7:
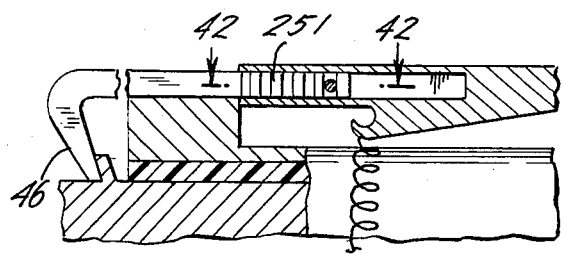
Figure 9:
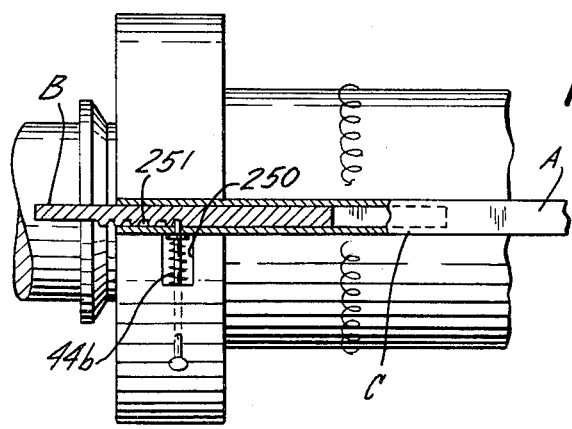

Referring now to FIGS. 6 to 9, there is shown an adjustable coupling device. In the coupling device of FIGS. 6 to 9, each of the connecting rods 34", 36" and 37" (not shown) are formed of two sections including a first section A which is pivotally mounted to first end 18 of the socket member, as shown, and a second section B which is disposed in a slot C in the first section A. The first section A includes at least one opening 250 in communication with the slot C. The second section B includes a plurality of openings or notches 251 such that when the second section B is positioned within the slot C of the first section A, at least one of the openings or notches 251 will be in alignment with the opening 250 of the first section A. Spring biased pin means 44b are connected to each of the connecting rods in a manner such that the end of the pin means will pass through the opening 250 and engage one of the openings or notches 251 in the second section B and thereby hold section B in place as shown in the Figures.

It will be appreciated that when the plug member 14 is moved deeper into the socket member 12, the pin means 44b will be retracted from the openings or notches 251 and the second section B will be moved into the slot C of the first section A until the hook member 46 thereof engages the tooth or flange 82' of the plug member 14 and one of the notches or openings 251 is in alignment with the opening 250. The pin means 44b will then be released so that it engages one of the openings or notches 251 and thereby fixedly secure the plug member to the socket member.

What is claimed is:

1. A coupling device comprising, in combination, a socket member and a plug member adapted to be removably and adjustably disposed in said socket member, said plug member including inner walls defining a bore running therethrough and at least one securing means, said plug member comprising a conical-like member including a first tubular end segment, an intermediate segment and a second end segment connected to the wider end segment of said conical-like member; the inner bore of said plug member running through each of said first end, intermediate and second end segments of said plug member, said socket member comprising a body portion including inner walls defining a passageway running therethrough, said body portion of said socket member including first and second end portions, and an intermediate portion, said passageway in the form of a bore running through each of said portions, said bore defining a tapered passage, the wide segment of which extends from said first end portion into said intermediate portion, the first tubular end segment and intermediate segment of said plug member being adapted to seat in said tapered passage of said socket member, said tapered passage of said socket member including a wear-resistant lining material which contacts the outer surface of said conical-like segment of said plug member when said plug member is seated in said tapered passage of said socket member, said second end portion of said socket member including attaching means for attaching said socket member to a conduit, said plug member being adapted to be retained and adjustably positioned in said passageway to form a substantially fluid-tight seal with said socket member, whereby as portions of said socket member in contact with said plug member wear, said plug member can be repositioned in said socket member to continue to maintain a substantially fluid-tight seal with said socket member, said socket member further including at least one connecting member adapted to engage said securing means of said plug member to retain said plug member in said socket member in substantially fluid-tight engagement, said connecting member of said socket member comprising at least one connecting rod, said rod comprising at least first and second sections, said first section including a first end pivotally mounted to said socket member, and a second end which includes a longitudinal slot and at least one opening, in communication with said longitudinal slot, said second section in part including a first end which includes a latch-like member for engaging said securing means of said plug member, and a second end disposed in said longitudinal slot and including at least two pin engaging means, one pin engaging means being adapted to be in alignment with said opening of said first section, and pin means connected to said connecting rod and adapted to pass through said opening in said first section and engage one of said pin engaging means in said second section to fix the position of said first and second sections relative to each other and fix the position of said latch-like member of said second section relative to said securing means of said plug member.

2. The coupling device in accordance with claim 1 wherein said second end segment of said plug member includes attaching means for attaching said plug member to a conduit.

3. The coupling device in accordance with claim 1, wherein said connecting rod of said socket member is adapted to engage said securing means when said plug member is moved from its initial seated position to a second deeper position within said socket member.

4. The coupling device in accordance with claim 1 wherein said securing means of said plug member comprises a plurality of teeth extending from said plug member; said teeth being disposed one behind the other, extending from said second end segment toward said tapered segment of said plug member.

5. The coupling device in accordance with claim 1 wherein said pin engaging means of said second section comprises at least two separate openings.

6. The coupling device in accordance with claim 1 wherein said pin engaging means of said second section comprises at least two separate ratchet teeth.

* * * * *